United States Patent
Yavo

(10) Patent No.: US 10,795,989 B2
(45) Date of Patent: Oct. 6, 2020

(54) SECURE JUST-IN-TIME (JIT) CODE GENERATION

(71) Applicant: Fortinet, Inc., Sunnyvale, CA (US)

(72) Inventor: Udi Yavo, Herzlia (IL)

(73) Assignee: Fortinet, Inc., Sunnyvale, CA (US)

( * ) Notice: Subject to any disclaimer, the term of this patent is extended or adjusted under 35 U.S.C. 154(b) by 145 days.

(21) Appl. No.: 15/449,965

(22) Filed: Mar. 5, 2017

(65) Prior Publication Data

US 2018/0253549 A1    Sep. 6, 2018

(51) Int. Cl.
G06F 21/53 (2013.01)
G06F 9/455 (2018.01)
G06F 8/41 (2018.01)
G06F 21/56 (2013.01)

(52) U.S. Cl.
CPC ............... G06F 21/53 (2013.01); G06F 8/41 (2013.01); G06F 9/4552 (2013.01); G06F 9/45516 (2013.01); G06F 21/563 (2013.01); G06F 2221/033 (2013.01)

(58) Field of Classification Search
CPC . G06F 21/53; G06F 21/51; G06F 8/41; G06F 8/447; G06F 9/44516; G06F 9/4552; G06F 9/45
See application file for complete search history.

(56) References Cited

U.S. PATENT DOCUMENTS 7,219,329 B2 * 5/2007 Meijer .................... G06F 8/447 717/106
2003/0131147 A1 * 7/2003 Wilt ........................ G06F 8/447 719/321
2006/0242709 A1 * 10/2006 Seinfeld .................. G06F 21/56 726/24
2008/0127142 A1 * 5/2008 Wrighton ............. G06F 9/45516 717/148
2008/0178163 A1   7/2008 Gschwind et al.
2010/0235377 A1 * 9/2010 Kuryata ............... G06F 9/45516 707/769

(Continued)

FOREIGN PATENT DOCUMENTS

WO    WO 2008/067329    6/2008

OTHER PUBLICATIONS

European Search Report and the European Search Opinion dated Jul. 18, 2018 From the European Patent Office Re. Application No. 18159497.9. (9 Pages).

*Primary Examiner* — Kristine L Kincaid
*Assistant Examiner* — Shaqueal D Wade
(74) *Attorney, Agent, or Firm* — Jaffery Watson Mendonsa & Hamilton LLP

(57) ABSTRACT

A method of securely executing a Just-In-Time (JIT) compiled code in a runtime environment, comprising using one or more processors for receiving from a JIT executing process a request to compile in runtime a code segment, initiating a JIT compiling process to compile the code segment in order to generate an executable code segment, storing the executable code segment in a shared memory and providing to the JIT executing process a pointer to the executable code segment in the shared memory. Wherein the JIT executing process having read-execute access rights to the shared memory and the JIT executing process and the JIT compiling process are different processes.

20 Claims, 3 Drawing Sheets

(56) References Cited

U.S. PATENT DOCUMENTS

2014/0181797 A1\* 6/2014 Beretta ..................... G06F 8/41
717/140
2017/0060554 A1\* 3/2017 Asami ................... G06F 9/4552
2017/0255780 A1\* 9/2017 Hughes ................ G06F 21/575

\* cited by examiner

SECURE JUST-IN-TIME (JIT) CODE GENERATION

FIELD AND BACKGROUND OF THE INVENTION

The present invention, in some embodiments thereof, relates to executing a Just-In-Time (JIT) compiled code in a runtime environment and, more particularly, but not exclusively, to securely executing a JIT compiled code in a runtime environment using a secure JIT compiler.

Most software code comprising a running software product, for example, an application, a program, a tool, a process and/or the like is loaded from one or more executable code segments provided from, for example, files, libraries and/or the like.

Traditionally, the code is compiled in advanced to produce the executable code segment(s) which may then be executed by one or more processors of a hardware platform, for example, a computing device, a processing node and/or the like.

The diversity of hardware platforms combined with the ever growing variety and complexity of the software products have led to fast evolution and adoption of JIT processing, i.e. JIT compilation and JIT execution. JIT processing which has become essential in today's processing environments allow delivery of un-compiled high level code segments comprising a plurality of computer program instructions, for example, source code, portable code such as, for example, bytecodes. Typically, the high level code segments are platform independent, for example, Java, .NET, JavaScript and/or the like. JIT compilers adapted to the specific processor architecture of the processor executing the software product may compile the platform independent high level code segments to generate executable code segments that may then be executed by the specific processor.

SUMMARY OF THE INVENTION

According to a first aspect of the present invention there is provided a computer implemented method of securely executing a Just-In-Time (JIT) compiled code in a runtime environment, comprising using one or more processors for:

Receiving from a JIT executing process a request to compile in runtime a code segment.

Initiating a JIT compiling process to compile the code segment to generate an executable code segment.

Storing the executable code segment in a shared memory.

Providing to the JIT executing process a pointer to the executable code segment ire the shared memory, the JIT executing process having read-execute access rights to the shared memory.

Wherein the JIT executing process and the JIT compiling process are different processes.

Separating the JIT compilation from the JIT executing process may allow improved control over the JIT executing process since the JIT compilation and new code generation may be done with increased security. As JIT compiler(s) are initiated and executed in the context of the JIT compiling process which is separate and independent of the JIT executing process, code generation privileges may be denied from the JIT executing process. Having no code generation privileges, the ability of the attacker, using the JIT executing process, to exploit and generate malicious code within the processing environment may be significantly reduced.

According to a second aspect of the present invention there is provided a system for securely executing a Just-In-Time (JIT) compiled code in a runtime environment, comprising one or more processor adapted to execute code. The code comprising:

Code instructions to receive from a JIT executing process a request to compile in runtime a code segment.

Code instructions to initiate a JIT compiling process to compile the code segment to generate an executable code segment.

Code instructions to store the executable code segment in a shared memory.

Code instructions to provide to the JIT executing process a pointer to the executable code segment in the shared memory, the JIT executing process having read-execute access rights to the shared memory.

Wherein the JIT executing process and the JIT compiling process are different processes.

According to a third aspect of the present invention there is provided a system for securely executing a Just-In-Time (JIT) compiled code in a runtime environment, comprising one or more processor adapted to execute code. The code comprising:

Code instructions to initiate a JIT executing process comprising one or more un-compiled code segment.

Code instructions to execute a JIT compiling process to compile the one or more code segment to generate one or more corresponding executable code segment.

Wherein in response to a request from the JIT executing process to compile the one or more code segment, the JIT compiling process compiles the one or more code segment to generate the corresponding executable code segment and stores the corresponding executable code segment in a shared memory to which the JIT executing process has read-execute access rights. Wherein the JIT executing process and the JIT compiling process are different processes.

With reference to the first, the second and/or the third aspects of the invention, according to a first implementation, the JIT compiling process employs a JIT compiler adapted to generate the executable code segment according to architecture of the one or more processors. The runtime compilation using the JIT compiler(s) allows for general platform (hardware) independent code to be executed on various hardware platforms by using the JIT compiler(s) suitable for a specific hardware platform to compile the platform independent code and generate platform specific and execute executable code.

With reference to the first, the second and/or the third aspects of the invention and/or the first implementation, according to a second implementation, the JIT executing process is denied code generation privileges. This may significantly reduce the ability of a malicious JIT executing process to alter, manipulate and/or manage code in the memory regions of the processor(s).

With reference to the first, the second and/or the third aspects of the invention and/or any of the previous implementations, according to a third implementation, the JIT executing process is denied of write access rights to the shared memory. By granting limited access rights to the shared memory in particular and to memory regions of the processor(s) in general, for example, granting read-execute access rights while denying write access rights, the ability of the JIT executing process to alter, manipulate, corrupt, damage and/or the like contents in the memory regions.

With reference to the first, the second and/or the third aspects of the invention and/or any of the previous implementations, according to a fourth implementation, the JIT compiling process is granted with read-write access rights to the shared memory to allow the storing. This allows the JIT compiling process to store the executable code segment(s) in the shared memory.

With reference to the first, the second and/or the third aspects of the invention and/or any of the previous implementations, according to a fifth implementation, the JIT compiling process is denied of execution access rights from the shared memory. Having no code execution access rights to the shared memory, the JIT compiling process is unable to execute the generated executable code segment(s). This may significantly reduce the ability of the potential attacker to take advantage of a potential bug and/or vulnerability in the JIT compiling process since the generated executable code segment(s) which may include malicious code may not be executed by the JIT compiling process.

Optionally, with reference to the first, the second and/or the third aspects of the invention and/or any of the previous implementations, according to a sixth implementation, the code segment is analyzed before generating the executable code segment to identify one or more potentially malicious operation initiated by the code segment. Analyzing the code segment prior to compiling it to detect malicious code segment(s) may significantly increase security, integrity, robustness and/or the like of the processor(s) execution environment. Analyzing the code segment which is high level may allow detecting attack vectors and/or methodologies that may be detectable at high level, i.e. prior to converting to executable code.

Optionally, with reference to the first, the second and/or the third aspects of the invention and/or any of the previous implementations, according to a seventh implementation, the executable code segment is analyzed after generated to identify one or more potentially malicious operation initiated by the code segment. Analyzing the executable code segment prior to execution to detect malicious code segment(s) may significantly increase security, integrity, robustness and/or the like of the processor(s) execution environment. Analyzing the executable code segment using one or more tools, for example, anti-virus may allow detecting attack vector patterns prior to executing the executable code thus preventing the malicious action(s) the malicious executable code may inflict.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
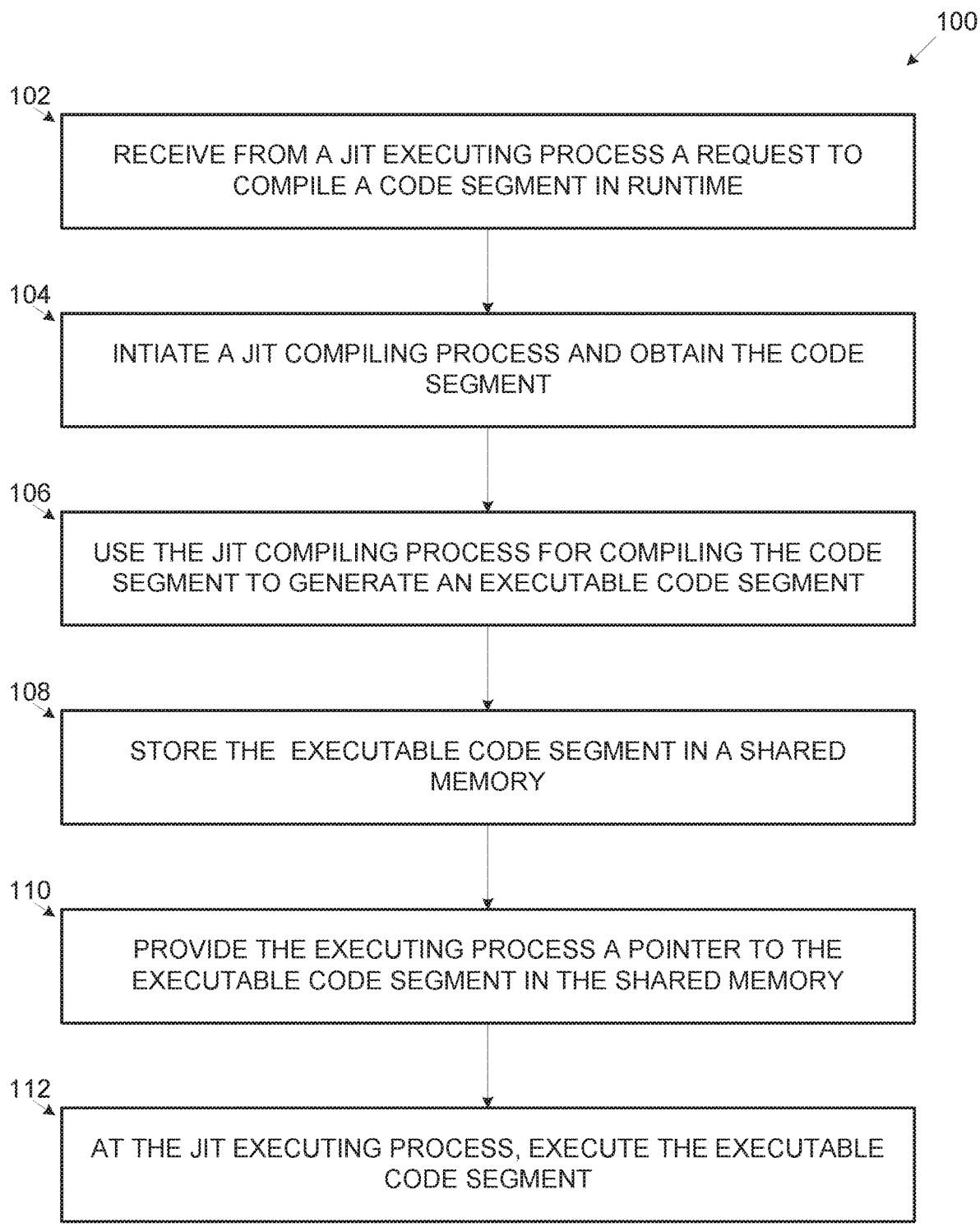
FIG. 1 is a flowchart of an exemplary process of securely executing a JIT compiled code in a runtime environment, according to some embodiments of the present invention.

The present invention, in some embodiments thereof, relates to executing a Just-In-Time (JIT) compiled code in a runtime environment and, more particularly, but not exclusively, to securely executing a JIT compiled code in a runtime environment using a secure JIT compiler.

According to some embodiments of the present invention, there are provided methods, systems and computer program products for securely executing JIT generated executable code segments by separating JIT compilation from an execution flow a JIT executing process executed in a runtime processing environment by one or more processors. The JIT executing process, for example, an application, a program, a tool, a process, a script and/or the like may include one or more un-compiled high level code segments comprising a plurality of computer program instructions, for example, source code, portable code, bytecode and/or the like. In order to execute them, the high level code segment(s) first need to be compiled in runtime. The JIT executing process may therefor issue a request to compile the high level code segment(s).

In response to the request, a separate JIT compiling process may be initiated, launched and/or executed to compile the high level code segments in runtime using one or more JIT compilers, for example, a Java compiler, a JavaScript engine, a .NET compiler and/or the like. The JIT compiler(s) compile the code segments to generate one or more executable code segments compliant with the processor architecture of the processor(s) running the JIT executing process. The JIT compiling process may store the executable code segment(s) in a shared memory accessible to the JIT executing process. While the JIT compiling process may have read/write access rights to the shared memory, the JIT compiling process may be denied of execution access rights to the shared memory. The JIT executing process on the other hand may only has read-execute access rights to the shared memory while denied of write access rights to the shared memory, in particular to the shared memory location(s) (e.g. page(s), sector(s), etc.) in which the JIT compiling process stored the executable code segment(s).

Optionally, the JIT compiling process uses one or more code analysis tools to analyze the code segment(s) before compiling it in order to verify the code segment(s), i.e. identify no malicious actions and/or operations may be initiated by the code segment(s). Such code analysis tools may typically be integrated in the JIT compiler(s). The JIT compiling process may further use one or more executable code analysis tools to verify the generated executable code segment(s), for example, an anti-virus tool.

After the executable code segment(s) is generated and stored in the shared memory, the JIT compiling process may provide the JIT executing process with a pointer to the executable code segment(s) in the shared memory. The JIT executing process may then execute the executable code segment(s) from the shared memory.

JIT compiling of the high level code segment(s) in the JIT compiling process which is separate and/or independent of the JIT executing process may present significant advantages compared to existing JIT compilation methods. In existing JIT compilation methods, typically the JIT executing process may initiate the JIT compiler to compile the high level code segment(s) and generate the executable code segment(s). As the JIT compiler(s) is initiated in the context (scope) of the JIT executing process, the JIT executing process may typically be granted with code generation privileges. Such code generation privileges may be easily exploited by a potentially malicious JIT executing process, a potential attacker and/or the like that may leverage a bug and/or a system vulnerability to generate, write and/or initiate malicious code that may initiate one or more malicious actions and/or operations in the processing environment. Moreover, in order to generate the executable code segment(s), the JIT compiler(s) may need to access one or more memory regions of the processor, for example, a system memory, a storage space, a network resource and/or the like. Therefore, in order to support the JIT Compiler(s) in the context (scope) of the JIT executing process as done in the existing JIT compiling methods, the JIT executing process may be granted with modification (write) access rights to the memory region(s). Allowing the JIT executing process to alter, manipulate and/or manage the memory regions may further expose the processing environment to potential malicious executing processes, potential attackers and/or the like which may damage contents stored in the memory resources in the processing environment.

Separating the JIT compilation from the JIT executing process on the other hand may allow significantly better control over the JIT executing process since the JIT compilation and new code generation may be done significantly more secure. As the JIT compiler(s) is initiated and executed in the context of the JIT compiling process which is separate and independent of the JIT executing process, code generation privileges may be denied from the JIT executing process. Having no code generation privileges, the ability of the attacker to exploit and generate malicious code within the processing environment may be significantly reduced. Moreover, since the JIT compilation is done by the JIT compiling process and stored in a shared memory, the JIT executing process may be granted with read-execute access rights while denied write access rights to the shared memory in particular and to the memory regions of the processor(s) in general. This may significantly reduce the ability of the JIT executing process to alter, manipulate and/or manage code in the memory regions. This may further significantly reduce the ability of the JIT executing process to alter, corrupt, damage and/or the like content stored in the memory regions.

Moreover, having no code execution access rights to the shared memory, the JIT compiling process is unable to execute the generated executable code segment(s), i.e. the newly generated executable code segment(s) may not be executed in the context (scope) of the JIT compiling process. This may significantly reduce the ability of the potential attacker to take advantage of a potential bug and/or vulnerability in the JIT compiling process since the generated executable code segment(s) which may include malicious code may not be executed by the JIT compiling process.

The performance impact of compiling the code segment(s) using the JIT compiling process may be insignificant since only very little communication is exchanged between the JIT executing process and the JIT compiling process due to the shared memory architecture. The JIT compiler itself which may be a major time consumer is used by the JIT compiling process as it is typically used by the JIT executing process as done in the existing methods and therefore no performance penalty is involved in the JIT compiler operation.

Furthermore, by analyzing and verifying the code segment(s) and/or the generated executable code segment(s), one or more malicious code segments may be identified and the code segment(s) may be prevented from executing. This may significantly decrease potential threats from the malicious process to exploit vulnerabilities in the processing environment.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of securely executing a JIT compiled code in a runtime environment, according to some embodiments of the present invention. A process 100 may be executed to separate JIT compilation from an execution flow a JIT executing process executed in a runtime processing environment by one or more processors. The JIT executing process may include one or more un-compiled high level code segments which need to be compiled in runtime before they may be executed. The JIT executing process may issue a request to compile the high level code segment(s). In order to compile the high level code segments a separate JIT compiling process may be may be initiated, launched and/or executed to compile the high level code segments in runtime using one or more JIT compilers and generate one or more executable code segments compliant with the processor architecture of the processor(s) running the JIT executing process. The JIT compiling process may store the executable code segment(s) in a shared memory accessible to the JIT executing process with read-execute (no write) access rights. The JIT executing process may then execute the executable code segment(s) from the shared memory using a pointer provided by JIT compiling process.

Figure 2:
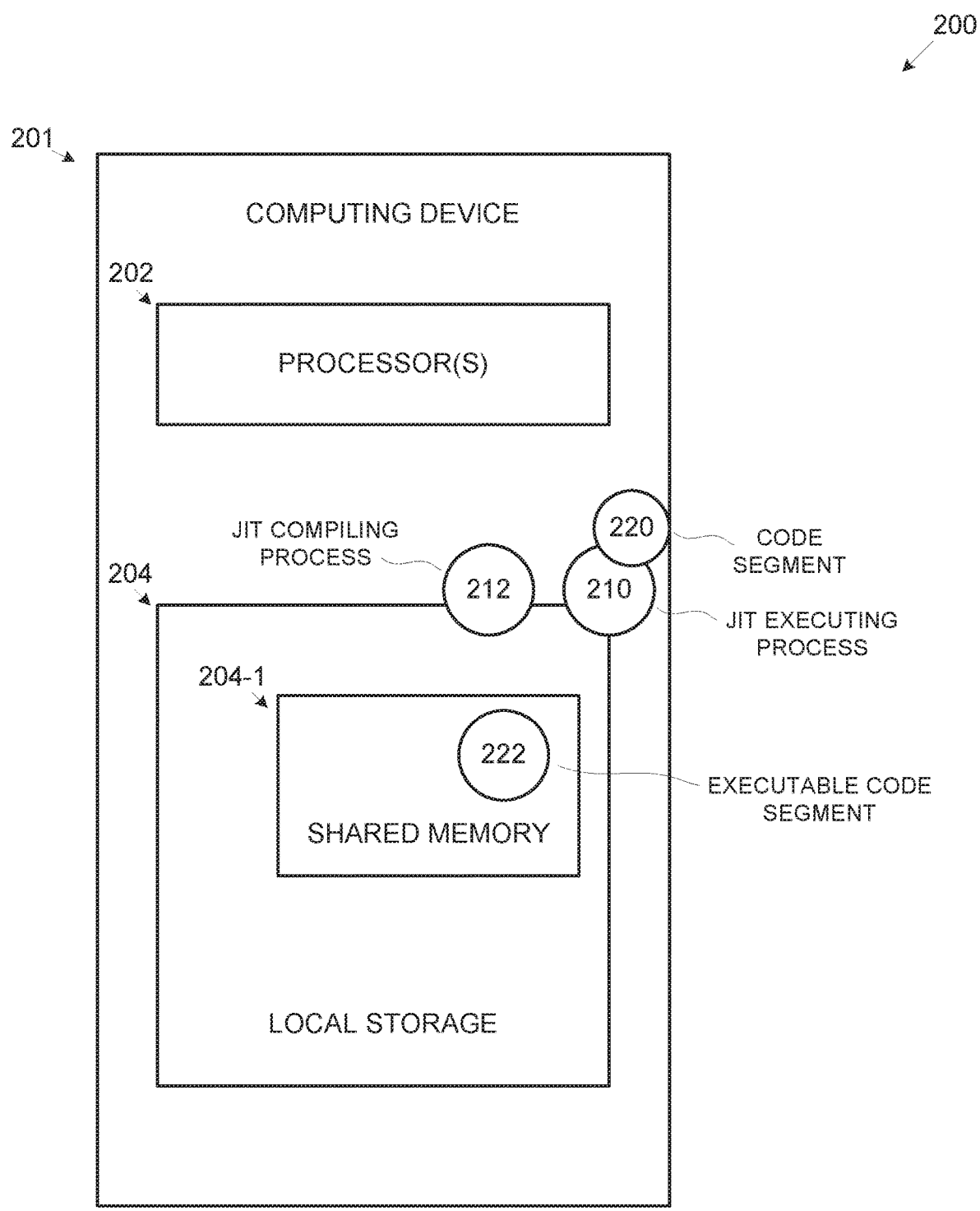
FIG. 2 is a schematic illustration of an exemplary system for securely executing a JIT compiled code in a runtime environment, according to some embodiments of the present invention.

Reference is also made to FIG. 2, which is a schematic illustration of an exemplary system for securely executing a JIT compiled code in a runtime environment, according to some embodiments of the present invention. A system 200 for executing a process such as the process 100 includes a computing device 201, for example, a computer, a processing node, a server, a mobile device, a Smartphone, a tablet and/or the like. In practice, the computing device 201 may be any device comprising one or more processor(s) capable of executing software code instructions. The computing device 201 comprises a processor(s) 202 and a storage 204. The processor(s) 202 comprises one or more one or more processors (homogenous or heterogeneous), which may be arranged for parallel processing, as clusters and/or as one or more distributed core processing units. The processor(s) 202 may execute one or more software modules wherein a software module refers to a plurality of program instructions stored in a storage medium such as the storage 204 and executed by the processor(s) 202. The storage 204 may include one or more non-transitory storage devices, for example, a hard drive, a Flash array, an attached storage media and/or the like. The storage 204 may further include one or more volatile storage devices, for example, a random access memory (RAM) to which one or more software modules may be loaded from one or more of the non-transitory storage devices and/or from one or more remote locations over one or more networks.

Typically, the computing device 201 may further include one or more network interface for connecting to one or more networks, for example, a Local Area Network (LAN), a Wide Area Network (WAN), a cellular network, the internet and/or the like.

The processor(s) 202 may execute one or more one or more software modules, wherein a software module may be, for example, a process, an application, an agent, a utility, a service, a plug-in, a script, an add-on software and/or the like each comprising a plurality of program instructions stored in a non-transitory medium such as the program store 204 and executed by one or more processors such as the processor(s) 204. Typically, the computing device 201 hosts a OS, for example, Windows, Linux, UNIX, iOS, Android and/or the like which provides a runtime processing environment, services, infrastructure and/or the like for the software module(s) executed by the processor(s) 202.

The processor(s) 202 may execute, for example, an executing process 210, in particular a JIT executing process which includes one or more un-compiled high level code segments 220 comprising a plurality of computer program instructions, for example, source code, portable code, byte-code and/or the like. The code segments 220 may be hardware platform independent code segments, for example, Java, .NET, JavaScript and/or the like. In order for the JIT executing process 210 to execute the code segments 220, the code segment(s) 220 first needs to be compiled and one or more corresponding executable code segments 220 need be generated. However, the JIT executing process 210 may be configured, for example, by the OS to prevent the JIT executing process 210 from generating executable code, in particular, in runtime. For example, in Windows, the setting ProcessDynamicCodePolicy setting may be enabled for the JIT executing process 210 and the compiling process thus prohibiting the JIT executing process 210 to generate executable code.

The processor(s) 204 may further execute a JIT compiling process 212 to compile one or more of the code segments 220 to generate the executable code segment(s) 222. It is emphasized that the JIT compiling process 212 is a separate process from the JIT executing process 210.

In some embodiments, the JIT compiling process 212 may be executed at an OS level of the OS executed by the processor(s) 204. When the OS detects the request from the JIT executing process 210 to compile the code segment(s) 220, the OS may initiate the JIT compiling process 212 to compile the code segment(s) 220 to generate the executable code segment(s) 222.

In some embodiments, the JIT compiling process 212 may be executed at an application level of an executed by the processor(s) 204. For example, in case the JIT executing process 210 is executed in the context (scope) of a web browser application such as, for example, CHROME™, FIREFOX®, Internet INTERNET EXPLORER®, EDGE™, OPERA™ and/or the like, the web browser application may detect the request from the JIT executing process 210 to compile the code segment(s) 220. In response to the request, the web browser application may initiate the JIT compiling process 212 to compile the code segment(s) 220 to generate the executable code segment(s) 222. In another example, the application is a local agent of executed by the processor(s) 202 to provide a remote service, for example, YouTube, Facebook and/or the like provided by, for example, a remote webserver, a remote computing node, a remote computing cluster, a cloud service and/or the like. Management of the JIT compiling process 212 as a separate process from the JIT executing process 210 may be added to the application as, for example, a plug-in, a script and/or the like. Optionally, management of the JIT compiling process 212 may be built-in into the application.

One or more shared memory regions such as the shared memory 204-1 may be defined, constructed, initialized and/or the like in the storage 204. For example, the shared memory 204-1 may utilize one or more memory pages, sectors and/or the like in the storage 204. The shared memory 204-1 may be used for storing the executable code segment(s) 222. The shared memory 204-1 may be mapped to each of the processes 210 and 212 with different access rights. For example, the JIT executing process 210 may be granted with read-execute access rights to the shared memory 204-1 while denied of write access writes. The JIT compiling process 212 however, may be granted with read/write access rights for the shared memory 204-1 while denied of execution access rights from the share memory. Typically, management of the shared memory 204-1 as well as access rights granting is done by the OS executed by the processor(s) 202. The initialization of the shared memory may done in the initialization of the both the executing and the compiling processes.

Naturally, the system 200 may apply the process 100 to compile and execute a plurality of code segments 220 for a plurality of executing processes 210 using a plurality of JIT compiling processes, however, for brevity, the system 200 as well as the process 100 are described for a single JIT executing process 210 comprising a single code segment 220 compiled by a single JIT compiling processes 212.

As shown at 102, a request is received, for example, by the OS, from the executing process 210, in particular the JIT executing process 210, to compile the code segment 220. The JIT executing process 210 may issue the request using one or more services provided by the OS, for example, a system call, a function call, an event handler, a message, a pipe and/or the like.

As shown at 104, in response to the request to compile the code segment 220, the JIT compiling process 212 is initiated. The JIT compiling process 212 is a separate and independent process from the JIT executing process 210. Initiation of the JIT compiling process 212 may include, for example, launching the JIT compiling process 212 in response to the compilation request. Optionally, the JIT compiling process 212 may be launched in advance, for example, on power-up of the computing device 201 such that the JIT compiling process 212 may already be executing (running) and waiting for the compilation request. For example, the JIT compiling process 212 may be executing in idle mode, in sleep mode and/or the like. In response to the compilation request, the JIT compiling process 212 may be initiated, for example, transitioned to an operational mode.

The JIT compiling process 212 may obtain, for example, receive, retrieve and/or collect the code segment 220 from the JIT executing process 210 using one or more of a plurality of services provided by the OS, for example, a message, a pipe and/or the like. Additionally and/or alternatively, the JIT compiling process 212 may fetch the code segment 220 from a shared memory location in the storage 204 in which the JIT executing process 210 stored the code segment 220.

As shown at 106, the JIT compiling process 212 may compile the code segment 220 using one or more JIT compilers adapted to generate code compliant with the architecture of the processor(s) 202, for example, a Java compiler, a JavaScript engine, a .NET compiler and/or the like.

Optionally, the JIT compiling process 212 applies one or more code analysis and/or verification tools, for example, static code analysis and/or the like to analyze the code segment 220 before compiling the code segment 220. Using the code analysis tool(s), the JIT compiling process 212 verifies the code segment 220 by identifying if the code segment 220 comprises malicious/malformed/unauthorized action(s) and/or operation(s) that may compromise the processing environment of the computation device 201. Using the code analysis tool(s), the JIT compiling process 212 may further detect forbidden code construction implementation(s) in the code segment 220 to verify that the code segment 220 is built, constructed and/or arranged according to allowed code construction conventions. In case the JIT compiling process 212 determines the code segment 220 may be suspected as potentially malicious, the JIT compiling process 212 may take one or more actions, for example, issue a notification, quarantine the code segment 220 and/or the like.

Optionally, the JIT compiling process 212 may apply one or more analysis tools, for example, an anti-virus tool to verify the generated executable code segment 222. In case the JIT compiling process 212 determines the executable code segment 222 may be suspected as potentially malicious, the JIT compiling process 212 may take one or more actions, for example, issue a notification, quarantine the executable code segment 222 and/or the like.

As shown at 108, the JIT compiling process 212 stores the executable code segment 222 in the shared memory 204-1. This is possible since the JIT compiling process 212 is granted read/write access rights to the shared memory 204-1. While able to store the executable code segment 222 in the shared memory 204-1, the JIT compiling process 212 which has no execution rights for the shared memory 204-1 may not execute the executable code segment 222.

However, in case while validating the code segment(s) 220 and/or the executable code segment(s) 222, the JIT compiling process 212 determines that the code segment 220 and/or the executable code segment 222 may present some threat to the processing environment of the computation device 201, the JIT compiling process 212 may avoid storing the executable code segment 222 in the shared memory 204-1 to prevent the JIT executing process 210 from executing the suspicious executable code segment 222.

As shown at 110, the JIT compiling process 212 provides the JIT executing process 210 a pointer to the location of the executable code segment 222 in the shared memory 204-1. The JIT compiling process 212 may use one or more services provided by the OS, for example, a system call, a function call, an event handler, a message, a pipe and/or the like to transfer the pointer to the JIT executing process 210.

As shown at 112, using the provided pointer, the JIT executing process 210 may execute the executable code segment 222 from the shared memory 204-1. The JIT executing process 210 is capable of executing the executable code segment 222 from the shared memory 204-1 since the JIT executing process 210 is granted with read-execute access rights to the shared memory 204-1. However, the JIT executing process 210 may not manipulate the shared memory 204-1, in particular for generating new executable code segment(s) since the JIT executing process 210 is not granted with write access writes to the shared memory 204-1.

Figure 3:
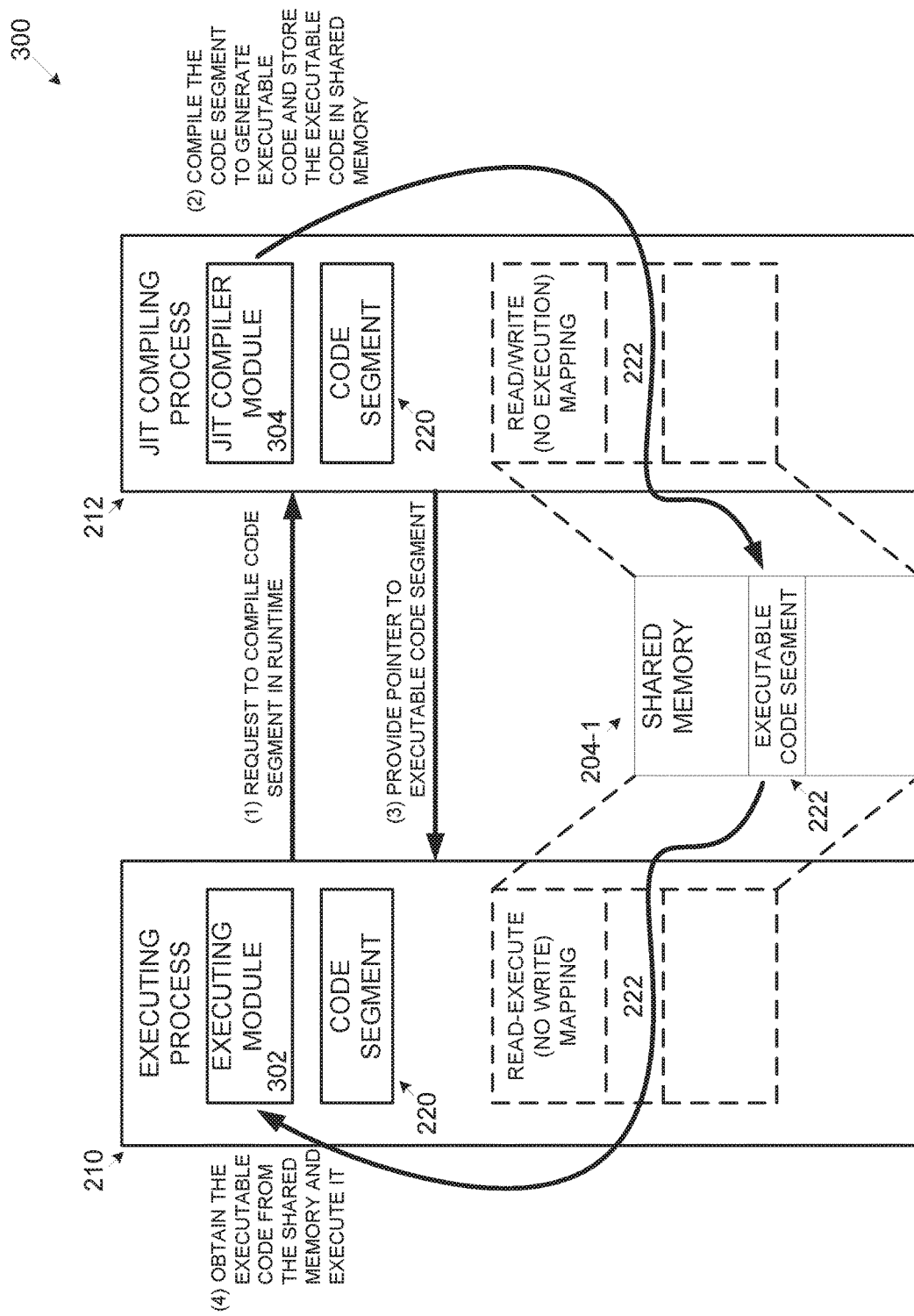
FIG. 3 is a schematic illustration of an exemplary sequence of securely executing a JIT compiled code in a runtime environment, according to some embodiments of the present invention.

Reference is now made to FIG. 3, which is a schematic illustration of an exemplary sequence of securely executing a JIT compiled code in a runtime environment, according to some embodiments of the present invention. A sequence 300 may be carried out by a process such as the process 100 executed by a computing device such as the computing device 201 in a system such as the system 200. An executing process such as the JIT executing process 210 is executed in a runtime processing environment of a processor(s) such as the processor(s) 202. The JIT executing process 210 comprises an executing module 302 for executing code program instructions and one or more un-compiled code segments such as the code segment 220. As shown (1), the JIT executing process 210 which may not be granted with code generation privileges issues a request to compile the code segment 220. In response to the request, a JIT compiling process such as the JIT compiling process 212 is launched. The JIT compiling process 212 may include one or more JIT compiler modules 304, for example, the Java compiler, the JavaScript engine, the .NET compiler and/or the like.

The JIT executing process 210 may provide the code segment 220 to the JIT compiling process 212 using one or more of the OS services, for example, the message, the pipeline, the shared memory and/or the like. As shown (2), after the JIT compiling process 212 obtains the code segment 220, the JIT compiling process 212 initiates the JIT compiler modules 304 to compile the code segment 220 to generate an executable code segment such as the executable code segment 222. The JIT compiling process 212 may then store the executable code segment 222 in a shared memory such as the shared memory 204-1 which is mapped as read/write memory for the JIT compiling process 212. As shown (3), the JIT compiling process 212 using one or more of the OS services provides a pointer pointing to the location of the executable code segment 222 in the shared memory 204-1. As shown (4), the executing module 302 having the shared memory 204-1 mapped for read-execute access, may execute the executable code segment 222 from the shared memory 204-1.

It is expected that during the life of a patent maturing from this application many relevant technologies and/or methodologies will be developed and the scope of the terms computation device and JIT compilers is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of securely executing a Just-In-Time (JIT) compiled code in a runtime environment, comprising:
    using at least one hardware processor for:
        receiving, by an application, from a JIT executing process that is executing in a context of the application a request to compile in runtime a code segment;
        initiating, by the application, a JIT compiling process to compile said code segment to generate an executable code segment, wherein said JIT compiling process is executed at an application level in the context of the application;
        storing said executable code segment in a shared memory; and
        providing to said JIT executing process a pointer to said executable code segment in said shared memory, said JIT executing process having read-execute access rights to said shared memory;
        wherein said JIT executing process and said JIT compiling process are different processes.

2. The computer implemented method according to claim 1, wherein said JIT compiling process employs a JIT compiler adapted to generate said executable code segment according to an architecture of said at least one hardware processor.

3. The computer implemented method according to claim 1, wherein said JIT executing process is denied code generation privileges.

4. The computer implemented method according to claim 1, wherein said JIT executing process is denied of write access rights to said shared memory.

5. The computer implemented method according to claim 1, wherein said JIT compiling process is granted with read-write access rights to said shared memory to allow said storing.

6. The computer implemented method according to claim 1, wherein said JIT compiling process is denied of execution access rights from said shared memory.

7. The computer implemented method according to claim 1, further comprising analyzing said code segment before generating said executable code segment to identify at least one potentially malicious operation initiated by said code segment.

8. The computer implemented method according to claim 1, further comprising analyzing said executable code segment after generated to identify at least one potentially malicious operation initiated by said code segment.

9. The computer implemented method according to claim 1, wherein:
    the runtime environment is provided by an operating system (OS),
    said JIT compiling process obtains said code segment from said JIT executing process using at least one of a plurality of services provided by the OS,
    said shared memory is managed by the OS, and
    said pointer is provided to said JIT executing process by said JIT compiling process using at least one service provided by the OS.

10. The computer implemented method according to claim 1, wherein a ProcessDynamicCodePolicy setting is enabled for said JIT executing process and said JIT compiling process.

11. The computer implemented method of claim 1, wherein the application comprises a local agent that provides a remote service provided by a remote web server, a remote computing node, a remote computing cluster or a remove cloud service.

12. The computer implemented method of claim 1, wherein management of said JIT compiling process is built into the application.

13. The computer implemented method of claim 1, wherein management of said JIT compiling process is added to the application via a plug-in.

14. The computer implemented method of claim 1, wherein the application comprises a web browser application.

15. A system for securely executing a Just-In-Time (JIT) compiled code in a runtime environment, comprising:
    at least one hardware processor adapted to execute code, said code comprising:
        code instructions of an application to receive from a JIT executing process executing in a context of the application a request to compile in runtime a code segment;
        code instructions of the application to initiate a JIT compiling process to compile said code segment to generate an executable code segment, wherein said JIT compiling process is executed at an application level in the context of the application;
        code instructions to store said executable code segment in a shared memory; and
        code instructions to provide to said JIT executing process a pointer to said executable code segment in said shared memory, said JIT executing process having read-execute access rights to said shared memory;
        wherein said JIT executing process and said JIT compiling process are different processes.

16. The system of claim 15, wherein the application comprises a local agent to provide a remote service provided by a remote web server, a remote computing node, a remote computing cluster or a remove cloud service.

17. The system of claim 15, wherein management of said JIT compiling process is built into the application.

18. The system of claim 15, wherein management of said JIT compiling process is added to the application via a plug-in.

19. The system of claim 15, wherein the application comprises a web browser application.

20. A system for securely executing a Just-In-Time (JIT) compiled code in a runtime environment, comprising:
    at least one hardware processor adapted to execute code, said code comprising:

code instructions of an application to initiate, in a context of the application, a JIT executing process comprising at least one un-compiled code segment; and code instructions of the application to execute, separate and independent from said JIT executing process, a JIT compiling process to compile said at least one code segment to generate at least one corresponding executable code segment, wherein said JIT compiling process is executed at an application level in the context of the application;

wherein in response to a request from said JIT executing process to compile said at least one code segment, said JIT compiling process compiles said at least one code segment to generate said corresponding executable code segment and stores said corresponding executable code segment in a shared memory to which said executing process has read-execute access rights.

* * * * *